Nov. 26, 1935.  W. S. JAMES  2,022,040
BRAKE LINING TESTING MACHINE
Filed Jan. 26, 1929  4 Sheets-Sheet 1

INVENTOR.
William S. James
BY P. W. Pomeroy
ATTORNEY

Nov. 26, 1935.  W. S. JAMES  2,022,040
BRAKE LINING TESTING MACHINE
Filed Jan. 26, 1929     4 Sheets-Sheet 2

INVENTOR.
William S. James
BY
ATTORNEY

Nov. 26, 1935.  W. S. JAMES  2,022,040
BRAKE LINING TESTING MACHINE
Filed Jan. 26, 1929    4 Sheets-Sheet 3
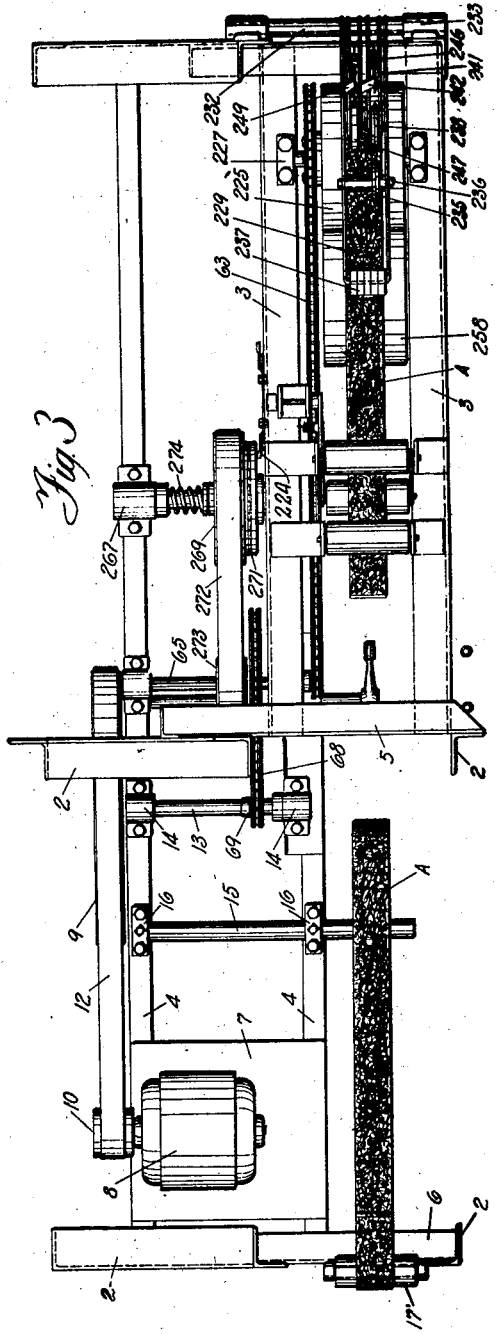
INVENTOR.
William S. James
BY
ATTORNEY

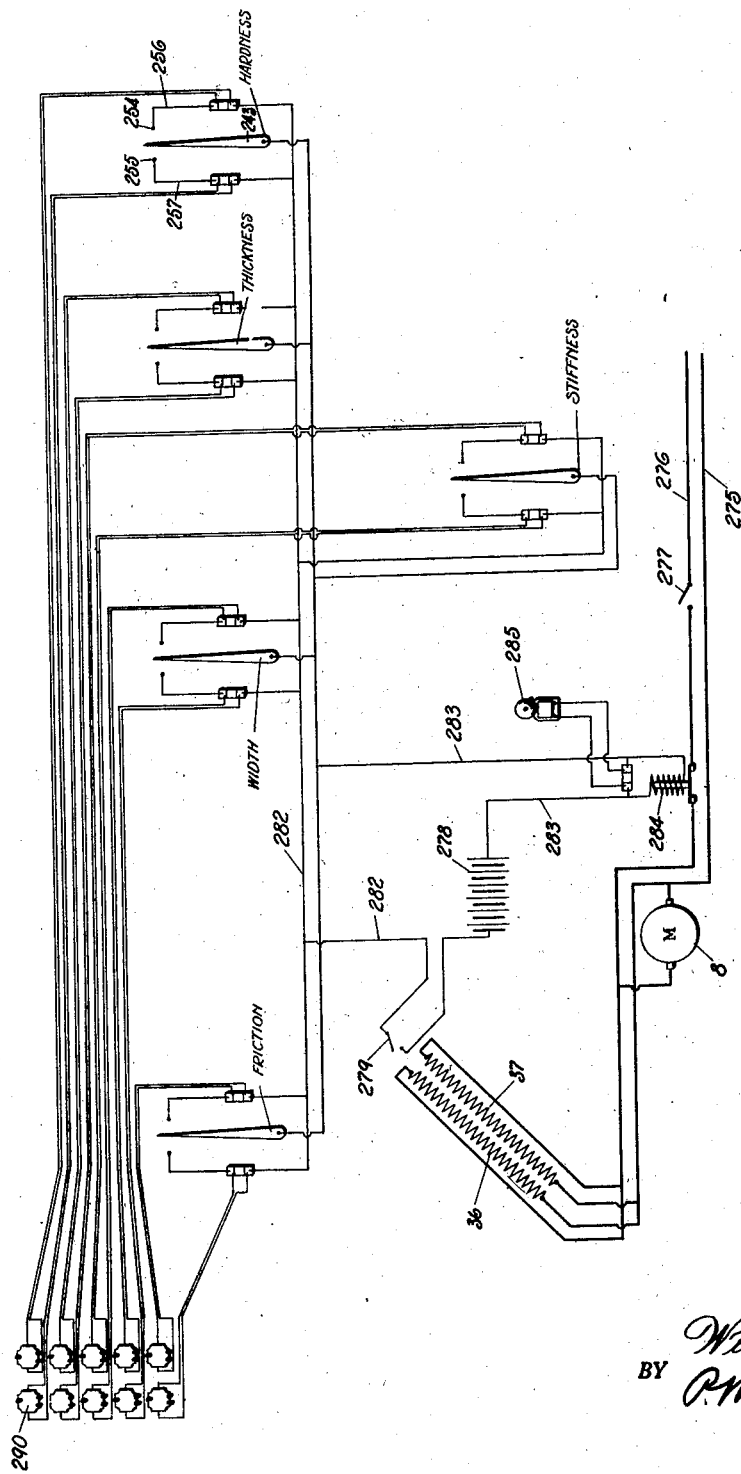

Patented Nov. 26, 1935

2,022,040

UNITED STATES PATENT OFFICE 2,022,040

BRAKE LINING TESTING MACHINE

William S. James, South Bend, Ind., assignor, by mesne assignments, to Bendix Aviation Corporation, South Bend, Ind., a corporation of Delaware Application January 26, 1929, Serial No. 335,178

9 Claims. (Cl. 265—12)

This invention relates to a machine for testing brake lining prior to mounting the same on the brake shoe, brake band, or other braking medium for commercial use.

It has been found by automobile and other manufacturers, that brake lining purchased from the makers of that material varies considerably and that it does not run true to grade and specifications. Due to the variations in the brake lining, it has often been found that different shipments of well known and approved brands are so unlike that uniform results are impossible, and that the different linings give entirely differing braking results. As an example, different rolls of lining from the same manufacturer may vary greatly in friction coefficient, width, thickness, stiffness or hardness. It will thus be seen that material variations in the different linings due to any of the above or other causes will make the lining to be unsuited for use, especially if the same is to be used as a braking medium where close limits are necessary.

An object of this invention is therefore to provide a machine for determining the hardness of friction lining as it passes through a machine.

Another object of the invention is to provide a device for quickly determining the hardness of friction lining as it is passed through the machine.

A further object is to provide means for stopping the travel of the brake lining in the event that the hardness of the lining is outside of the predetermined limits established for the test to which the lining is subjected.

These being among the objects of the present invention, the same consists of certain features of construction and combinations of parts to be hereinafter described with reference to the accompanying drawings and then claimed having the above and other objects in view.

In the accompanying drawings which illustrate a suitable embodiment of the present invention, Figure 1 is a side elevation of the machine embodying my invention.

Figure 3 is a sectional view taken on the line 3—3 of Figure 1 showing the travel of the brake lining and the driving mechanism therefor.

Figure 6 is a wiring diagram, showing the electric power line and the indicating mechanisms connected with the several measuring devices.

Figure 1:
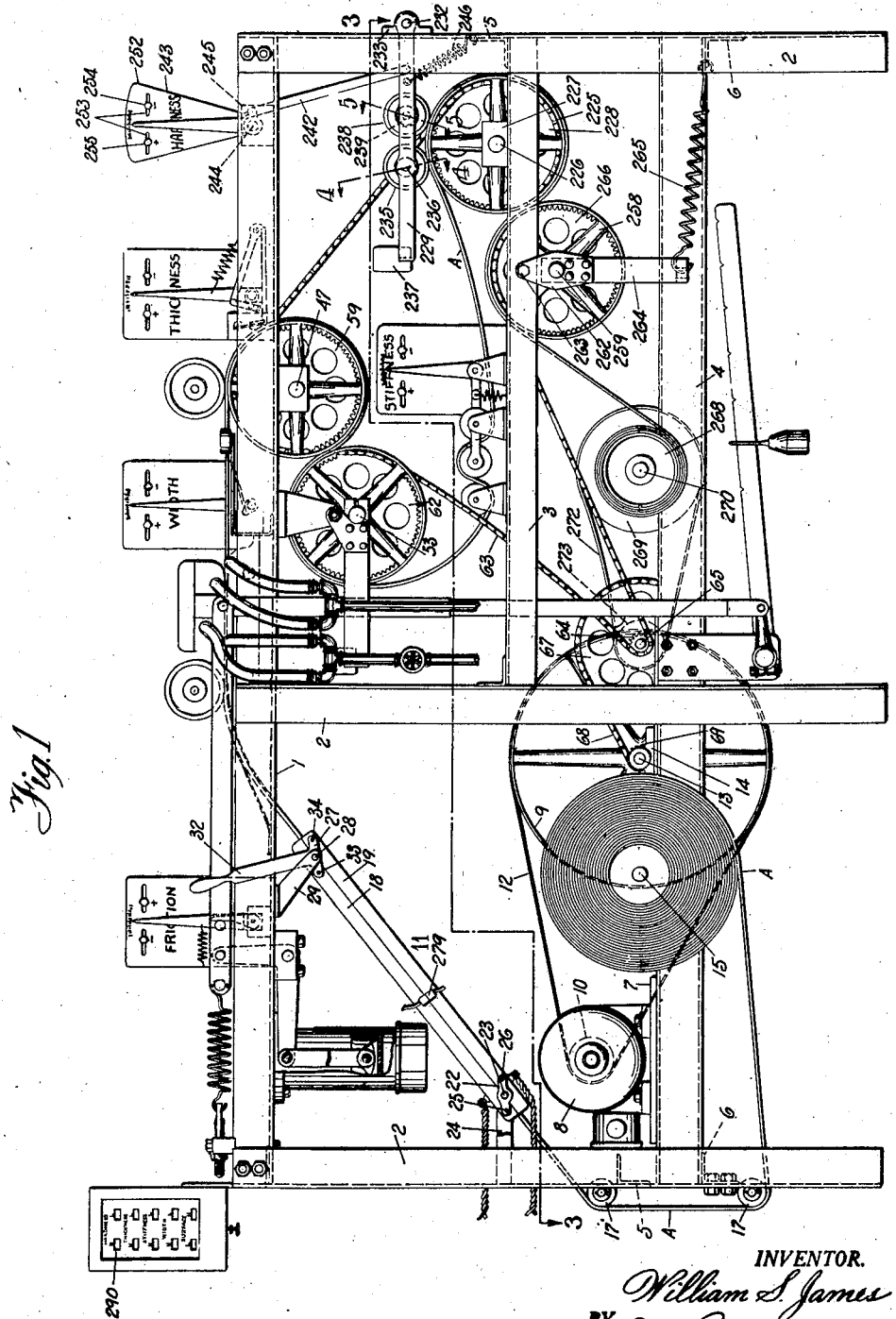

The present invention is directed particularly to a hardness tester, and is illustrated as one element of a machine which also includes a stiffness tester, a friction tester, a width tester, a thickness measuring device, signal means and circuit controlling means actuated by each of the various testing devices.

Referring to the numbered parts of the drawings in which like numerals refer to like parts throughout the several different views, the frame comprises a longitudinally extending top frame channel member 1, a plurality of uprights 2, upper and lower sub-frame members 3 and 4, and upper and lower end cross members 5 and 6. A plate 7 secured to the sub-frame members 4 supports the electric motor 8 having a pulley 10 connected by the belt 12 to the pulley 9 mounted on the shaft 13 which is supported on the sub-frame members 4 by bearings 14. A shaft 15 mounted in bearings 16 supported on the sub-frame members 4 is adapted to support the roll of braking lining A to be tested.

The brake lining A is progressively moved through the machine by means to be hereinafter described. In starting the brake lining through the machine, it is unwound from its roll and is passed over a pair of idlers 17 and 17' supported below and above the cross members 6 and 5 respectively. The brake lining A is then passed through a heating casing comprised of two sections having insulated cases 18 and 19. The sections 18 and 19 are pivotally connected adjacent their one end by means of the links 22 mounted on trunnions 23 which are supported by the brackets 24 secured to the uprights 2. The heater sections 18 and 19 have pins 25 and 26 extending from opposite sides thereof on which the links 22 are pivotally mounted for connecting the sections of the heater for operative position. The heater sections 18 and 19 at the end opposite the shaft 23 are joined together by means of a pair of links 27 mounted on trunnions 28 which are supported by the brackets 29 secured to the top frame channel member 1. One of the links 27 preferably has a handle 32 extending therefrom for operating the heater sections 18 and 19 to open and close the same and also for the purpose of operating an electric switch to be hereinafter described.

The heater sections 18 and 19 have pins 33 and 34 extending from opposite sides thereof on which the links 27 are pivotally mounted for connecting the sections for operative position. It will thus be seen that when the handle 32 is moved in a clockwise direction from the position shown in Figure 1 that the links 27 which are pivoted on the trunnions 29 will separate the heater sections 18 and 19 and at the same time disconnect the electric switch 279.

The heater just described may perform a dual purpose. First, the heating of the brake lining A prior to its being tested for various defects is desirable as the same is then tested under conditions comparable with the conditions under which it is subjected in commercial use. Second, the heating of the brake lining will bring to the surface thereof the binder or impregnating material to determine if the binding agents are of the proper consistency and are best suited to the purpose for which they are intended.

Figure 4:
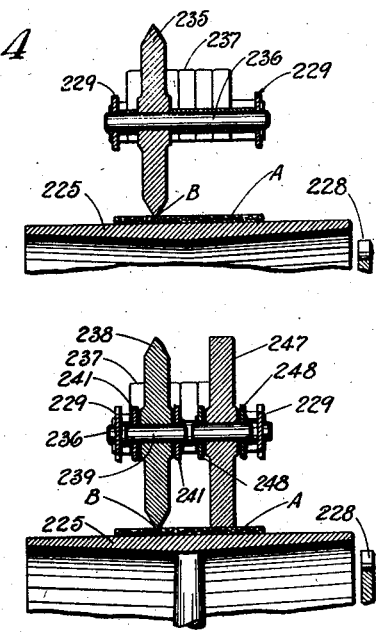
Figure 4 is an enlarged sectional view taken on the line 4—4 of Figure 1, showing the roller for forming a groove in the brake lining as a means for testing the hardness thereof.

Referring particularly to Figures 1, 2, 3, 4, and 5, the means for testing the hardness of the brake lining will now be described. A pulley 225 is mounted on a shaft 226 supported by suitable bearings 227 mounted on the sub-frame member 3 and a sprocket 228 is also mounted on the shaft 226 driven by the sprocket chain 63 which in turn also rotates the pulley 225. A looped arm 229 is pivoted at 232 at its one end in bearings 233 secured to the vertical frame members 2 by means of the bolts 234. An indenting roller 235 is mounted on a shaft 236 supported by and intermediate the ends of the looped arm 229. The roller 235 is preferably positioned above the pulley 225 and is adapted to ride on the brake lining A as shown in Figure 4 to form a groove in the face thereof. A weight 237 is adjustably mounted on the looped arm 229 to exert a pressure on the indenting roller 235 so that sufficient pressure will be applied thereto to form the indentation or groove B in the brake lining A. A second roller 238 similar to the roller 235 rides in the groove B formed in the brake lining A, the same being mounted on a shaft 239 carried by a pair of arms 241 pivoted at their ends on the shaft 232.

A link 242 is pivoted at its one end to one of the arms 241 and at its opposite end to an indicator 243 pivotally supported on the shaft 244 mounted in a bearing 245 supported by the top frame member 1. A spring 246 is also connected at its one end to the arm 241 and at its opposite end to the frame to exert tension on the roller 238 so that it will at all times follow the groove B formed in the brake lining A. A smooth faced roller 247 is pivotally mounted on a pair of arms 248 which is pivotally supported on the shaft 232. The roller 247 is adapted to ride on the smoth face of the brake lining A, indicating mechanism being provided to show the measurement or depth of the groove B in the brake lining A as measured by the variations or vertical movements of the rollers 238 and 247. To indicate the variations, a link 249 is pivoted at its one end to one of the arms 248 and at its other end to a plate 252 pivotally mounted on the shaft 244. The plate 252 is provided with slots 253 therein to adjustably receive the terminals 254 and 255 of the lead wires 256 and 257 connected with a suitable source of electrical energy.

Figure 5:
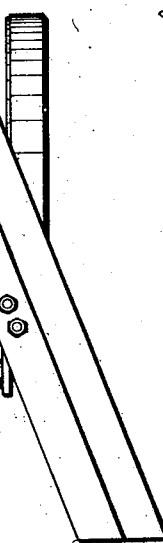
Figure 5 is an enlarged sectional view taken on the line 5—5 of Figure 1, showing a further detail of the means for testing the hardness of the brake lining.
Figure 2:
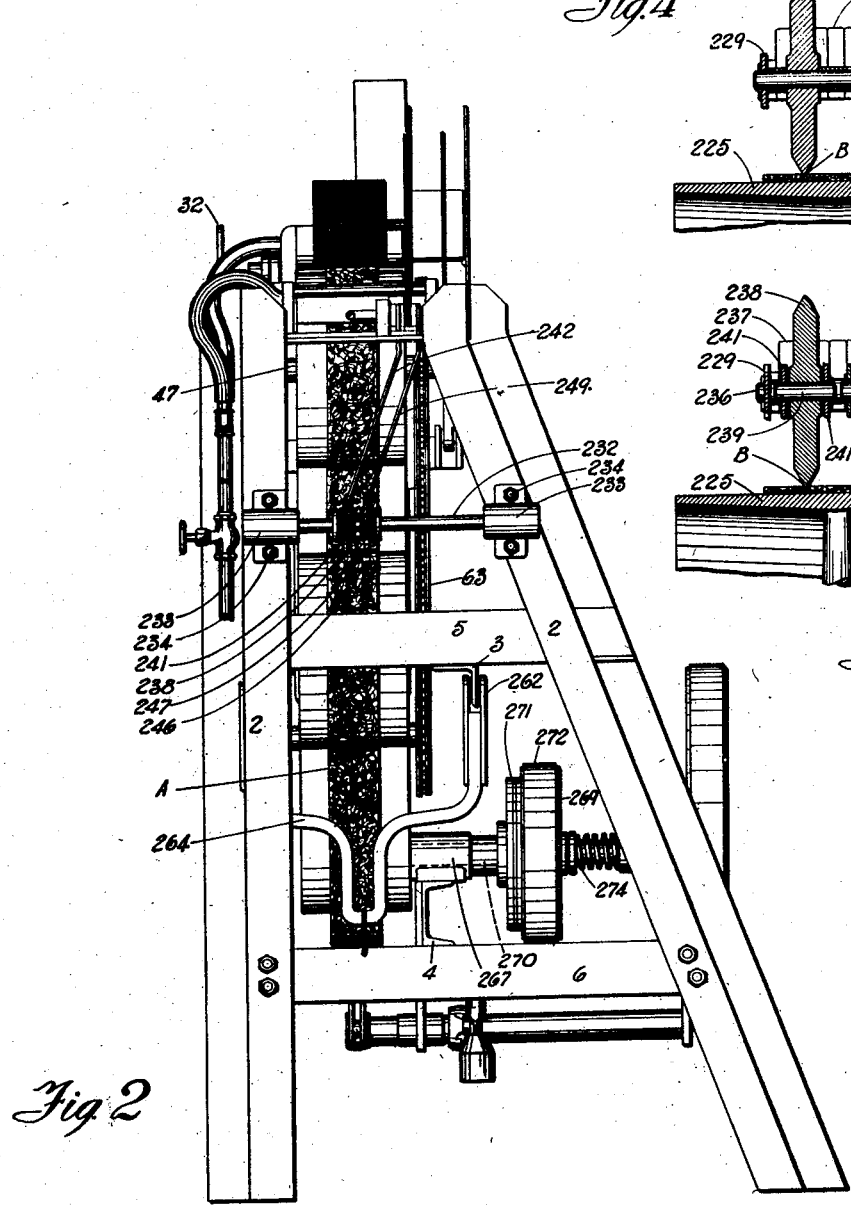
Figure 2 is a rear end elevation thereof.

Referring particularly to Figure 5 it will be seen that if the brake lining is of uniform hardness and therefore groove B formed therein is of uniform depth that the rollers 238 and 247 will not register any variations by means of the indicator 243 and plate 252 because both the plate 252 and indicator 243 will move in unison. If, of course, there is no variation in the thickness of the brake lining and the groove B is uniform, that is, of a constant depth, the indicator and plate will maintain the position shown in Figure 1. If, however, the depth of the groove B does vary, the indexing roller 238 will have a slight vertical movement which through the arms 241 and link 242 will register variations by the indicator 243. At the same time, the roller 247 through the arms 248 and link 249 will tend to oscillate the plate 252 in the event the thickness of the brake lining A shows a variation. For example, if the brake lining is of increased thickness, the roller 247 will be moved upwardly, moving its corresponding link 249 upwardly thus moving the plate 252 in an anticlockwise direction on its pivot 244. If, at the same time the groove B in the brake lining A is of a predetermined depth, the indexing roller 238 will also rise due to the increased thickness of the brake lining which in turn will move the link 242 upwardly to oscillate the indicator 243 in an anticlockwise direction.

If, on the other hand, the groove B in the brake lining is of a depth greater than the predetermined limits, the indicator 243 will oscillate from the position as shown in Figure 1 or will move in a clockwise direction. If the variations in the depth of the groove are outside of the predetermined limits for the groove, the indicator 243 would then be moved into contact with the terminal 254 on the lead wire 256 to close the electric circuit and thus stop the progressive movement of the brake lining. Conversely, if the depth of the groove is less than the predetermined limits to show the hardness of the brake lining, the indicator 243 would be moved in an anticlockwise direction into engagement with the terminal 255. It would also close the electric circuit and stop the progressive movement of the brake lining.

A pulley 258 is mounted on the shaft 259 supported by a bracket 262 pivotally mounted at 263 on the sub-frame 3. An arm 264 extending downwardly from the bracket 262 has connected at one end thereof a spring 265 which is connected at its opposite end to the frame member 6. The tension of the spring 265 tends to pull the pulley 258 toward the pulley 225 thus exerting pressure on the brake lining A as the same is passed between the pulleys 225 and 258. Mounted on the shaft 259 is a sprocket 266 driven by the chain 63, thus the pulleys 225 and 258 are driven in unison. The friction exerted on the brake lining by means of the pulleys 225 and 258 draws the same in its progressive movement so that the indenting roller 235 and indexing roller 238 will function for the purpose heretofore described.

A shaft 270 is mounted in suitable bearings 267 on the frame and supports thereon a drum 268 on which the brake lining which has been tested will be rolled. The shaft 270 and drum 268 are rotated by means of a pulley 269 driven by the belt 272 which in turn is driven from the pulley 273 mounted on the shaft 65. A clutch mechanism 271 is mounted on the shaft 270 and the pulley 269 is held in frictional engagement therewith by means of the spring 274. The clutch mechanism is provided because of the fact that the circumference of the brake lining changes continually as the lining is being wound on the drum 268 and it is desirable to take up the slack in the brake lining as the same is delivered from the pulley 258 to the winding roll 268.

In Figure 6 I have shown diagrammatically the means for indicating the defects in the brake lining being tested which are outside of the predetermined limits acceptable for commercial use, and the several means for closing the electric circuit. The motor 8 is connected with the power line indicated at 275 and 276, the same being provided with a switch 277 for closing or opening the circuit to start and stop the motor. It will be seen that the heating elements 36 and 37 are connected in the power line so that at all times when the motor is running the heating elements 36 and 37 will be effective for heating the brake lining.

A battery 278 is preferably provided as a source of electrical energy for the indicating mechanisms to determine the friction coefficient, width, thickness, stiffness and hardness of the brake lining. A switch 279 is preferably mounted on the heater casing elements 18 and 19 formed in the lead wire 282. When the handle 32 is moved to open the heater sections 18 and 19, the switch 279 will be opened, thus opening the circuit in the line 282. In the line 283 from the battery, a relay 284 is positioned to open or close the main power line as will be hereinafter described.

In the event that the hardness of the brake lining is without the predetermined limits the indicator 243 will be moved into contact with one of the terminals 254 and 255 of the lead wires 256 and 257 thus closing the electric circuit to operate the relay 284 to open the main power circuit and stop operation of the machine. This will ring the bell 285 to sound the warning and also operate the annunciator 290 to indicate that the hardness of the brake lining is without the predetermined limits.

The means for driving the several mechanisms comprises the motor 8, which drives the pulley 9 by means of the belt 12. The pulley 9 mounted on the shaft 13 drives the sprocket 69 which in turn drives the sprocket 67 mounted on the shaft 65 by means of the chain 68. The shaft 65 has a sprocket 64 thereon which drives the chain 63 which passes around the sprocket 62 mounted on the shaft 53, the sprocket 59 is mounted on the shaft 47, the sprocket 228 mounted on the shaft 226, and the sprocket 266 mounted on the shaft 259. A pulley 273 mounted on the shaft 65 also rotates the drum 268 mounted on the shaft 270 by means of the belt 272, the drum 268 being driven through the clutch mechanism 271 for winding the brake lining thereon after the same has been tested.

Some of the features disclosed but not claimed herein are being claimed in my copending application Serial No. 9,929, filed March 8, 1935, to wit, the friction tester and its associated mechanisms.

Having thus described my invention, it will be apparent that formal changes, and details relating to variations of structures can be made without departing from the spirit and substance of my invention, the scope of which is commensurate with the appended claims.

What I claim is:

1. A device for testing the hardness of brake lining comprising, a support for the lining to be tested, means for progressively moving the lining relative to said support, means for indenting a face of the lining as it is progressively moved, a roller mounted to rotate in the indentation, and means associated with said roller for measuring the depth of the indentation.

2. A device for testing the hardness of brake lining comprising, a support for the lining to be tested, means for progressively moving the lining relative to said support, means forming a groove in the lining, a roller formed to rotate in said groove, a flat faced roller rotatable on a face of the lining, and means associated with said rollers for measuring the depth of said groove.

3. A device for testing the hardness of brake lining comprising, a support for the lining to be tested, means for progressively moving the lining relative to said support, means for forming a groove in the lining, a roller pivotally mounted on said support adapted to rotate in said groove, a second roller pivotally mounted on said support rotatable on a face of the lining, and means operable by the pivotal movement of said rollers for measuring the depth of said groove.

4. A device for testing the hardness of brake lining comprising, a support for the lining to be tested, means for progressively moving the lining relative to said support, a roller having a V-shaped face for forming a groove in the lining, a roller having a V-shaped face rotatable in said groove, a flat faced roller rotatable on a face of the lining, and means operable by said two last named rollers for measuring the depth of the lining.

5. A device for testing the hardness of brake lining comprising, a support for the lining to be tested, means for progressively moving the lining relative to said support, a roller having a V-shaped face forming a groove in the lining, a roller having a V-shaped face rotatable in said groove, a flat faced roller rotatable on a face of the lining, an indicator operable by said second named V-shaped roller, and a pivotally supported plate movable by said flat faced roller whereby movement of said indicator and plate indicate the depth of said groove.

6. A device for testing the hardness of brake lining comprising, a support for the lining to be tested, means for progressively moving the lining relative to said support, a roller forming a groove in the lining, means including a second roller for measuring the depth of the groove, and means for stopping movement of the lining when its hardness is outside of predetermined limits.

7. A device for testing the hardness of brake lining comprising, a support for the lining to be tested, means for progressively moving the lining relative to said support, means for indenting a face of the lining as it is progressively moved, a roller mounted to rotate in the indentation, means associated with said roller for measuring the depth of the indentation, and means for stopping movement of the lining when its hardness is outside of predetermined limits.

8. A brake lining hardness tester comprising a movable support for the lining, a roller having a V-shaped edge for forming a groove in a portion of the lining, and registering means comprising another roller having a similar shaped projection and a flat surfaced roller designed to engage another portion of the lining to measure the relative depth of the groove formed by the first-named roller.

9. A brake lining hardness tester comprising a movable support for the lining, a roller having a V-shaped edge for forming a groove in a portion of the lining, registering means comprising another roller having a similar shaped projection and a flat surfaced roller designed to engage another portion of the lining to measure the relative depth of the groove formed by the first-named roller, and means for stopping the movable support when the harness of the brake lining is outside of predetermined limits.

WILLIAM S. JAMES.